June 1, 1965    E. A. LA BRIE    3,186,259

MULTIPLE SPEED BICYCLE HUB

Filed Nov. 19, 1964

INVENTOR
EUGENE A. LaBRIE
BY
ATTORNEY

United States Patent Office 3,186,259
Patented June 1, 1965

3,186,259
MULTIPLE SPEED BICYCLE HUB
Eugene A. La Brie, 456 High Ridge Road, Stamford, Conn.
Filed Nov. 19, 1964, Ser. No. 412,381
3 Claims. (Cl. 74—750)

This invention relates to an improved multiple speed gearing, and more particularly to three speed gearing for bicycle hubs. This application is in part a continuation of my copending application Serial No. 190,646, filed April 27, 1962 and now abandoned.

Multiple speed epicyclic gearing is used extensively for compact service, particularly the hubs of bicycles, light motorcycles and similar uses. Since the most important field of utility is in bicycle hubs the remainder of this specification will describe the invention more particularly in conjunction with bicycle hubs, it being understood that the invention is not limited to this particular use. Also the description will relate to a three speed hub, though applicable to other hubs, with four speeds for example with suitable multiplication of epicyclic gear trains. Since the present invention is an improvement in the shifting, detailed description of four or more speed hubs will be omitted as the present invention does not change the gearing arrangements.

For many years multiple speed bicycle hubs have achieved very widespread use, particularly the three speed hub. Among the hubs used is the wide ratio three speed hub sold by the Sturmey-Archer Company. This is one of the best designs and has been a standard unit for more than a generation. The present invention will therefore be more specifically described in conjunction with a wide ratio three speed hub of the design sold by Sturmey-Archer Gears. The principles of the present invention are applicable to other designs so long as the shifting is effected by lateral movement of a drive transmitting member, and so long as, in at least one speed, this member has to be introduced between projecting pins on the planetary cage of an epicyclic gearing.

The Sturmey-Archer wide ratio three speed hub operates in general as follows. There is a shaft which is fixed to the bicycle framework, and which carries a sun gear, around which revolve planetary geas in a cage, and finally a ring gear in a separate cage. The planetary gear cage carries an extension provided with ratchet pawls engaging corresponding members on the bicycle hub, so that when the cage is rotated in a forward direction the ratchets engage and it will drive the hub but the hub is capable of over-running it by the customary free wheeling action of the pawls. On the inner face of the planetary cage are projecting pins which may be the axles around which the gears themselves turn. Finally the ring gear is provided with an extension having drive engaging projections adjacent another set of pawls which drive in the forward direction a member which is rigidly attached to the hub. The hub, therefore, will be driven in a forward direction by the pawls if either the planet cage is rotated or the ring gear is rotated. Over-running of the hub by free wheeling action can occur in either case in the normal manner. Shifting is effected by a star shaped member which moves in slots in a sleeve rigidly connected to the chain sprocket. This star shaped member, which is of course driven in all positions by the sleeve, is provided at the ends with shoulders. The inner portion of the member connected to the ring gear is provided with internal projections sufficiently wide to engage the ends of the star shaped shifting member in two positions. Thus if this member has slid between the internal projections it will drive the ring gear regardless of whether the full width of the arm end is opposite the projections or only half width.

The star shaped shifting mechanism is movable by the conventional chain in a hollow in the stationary shaft, and connected by cable to a shifting lever on the bicycle frame near the handle bars. Operation can easily be understood by considering first second gear, that is to say the position in which the star shaped driving mechanism is centrally located. It now engages the internal projections of the member attached to the ring gear but the shoulder on the ends is too low to release the pawls connecting this member to the hub. Therefore forward driving of the chain sprocket turns the ring gear and its associated member at sprocket speed, the ring gear member is connected to the hub through its pawls, and therefore drives the hub in a forward direction at the same speed as the sprocket. The cage carrying the planets also moves around but at a slower speed as is normal with epicyclic gearing. The hub, however, is able to maintain its faster rotation because the pawls connecting the planet cage to the hub permit free wheeling.

Now if it is desired to enter the highest gear the lever on the frame is pushed forward and the driving star shaped member moves all the way to the left engaging the pins of the planets. The planet cage is, therefore, driven at sprocket speed, but of course the ring gear rotates faster, and since its associated member is connected to the hub through pawls the hub also will turn at this higher speed of the ring gear. Free wheeling over the pawls on the member connected to the planet cage occurs as before, permitting the hub to turn at a higher speed than does this cage.

In low gear the star shaped member is pulled out to its extreme right hand position. In this position the ends of the shifting mechanism still are connected with the internal projections of the ring gear member, but they also lock out the pawls which connect the ring gear member with the member on which the hub is rigidly mounted. This permits the member, and with it the hub, to move freely in either direction. In other words, the hub can move more slowly than the ring gear. Drive is now from the sprocket to the ring gear and from the more slowly rotating planet cage through the pawls to the hub, producing lower rotational speed of the hub by the conventional planetary gear drive method.

It should be noted that when the shift is made into high gear, that is to say when the star shaped driving member disconnects from the internal projections on the ring gear and drives through the planet pins it is possible during the shift for the star member momentarily to strike the pin end. This presents no problem because the chain and cable, while capable of pulling, is not capable of pushing, and so there is no direct rigid mechanical movement forcing the star shaped member against the pin, and as the planet cage moves somewhat as soon as the member clears the pin the light spring pressure urges it forward, it strikes the side of the next pin and drives in customary manner. No problem of wear or damage is encountered.

Hand shifting has had several practical drawbacks in spite of which it has been standard on bicycles with various hubs up to very recent years. Among the drawbacks of the manual shift is the necessity of taking one hand off the handle bars, the necessity of a cable on the outside of the bicycle frame which can catch and break, and an extreme precision of the adjustment of the shift lever for the actual movement of the star shaped member in shifting from one gear to another is very small. When the cable stretches it is necessary to readjust the shift lever clamp.

As a result there has been a need for a better shifting mechanism. With two speed hubs the problem has been solved and there are today on the market practical two speed hubs in which shifting is effected by brief back-pedalling, too small a movement to apply a coaster brake if the hub is provided with one. With various mechanisms, for example a coarse threaded shaft analogous to the Bendix drive on automobile starter motors rugged reliable two speed hubs have been produced. It should be noted that in a two speed hub there is never any gearing up or over-drive. High speed is a direct drive and low involves driving the ring gear, the hub being driven by the member attached to the planet cage. This never requires that a shifting mechanism be moved to contact pins or other projections on the planet cage as is the case in high gear in the three speed Sturmey-Archer hub described above. When, therefore, it was attempted to introduce a back pedal shift into the three speed hub, rapid wear, pin breakage, and other problems arose when the gears were shifted into high gear and the shifting members momentarily struck the end of a planet pin. The force of the back pedal shift is comparatively great and there is no limp cable which prevents application of excessive force, as in the hand shift. As a result, back pedal shifting has only been used with two speed hubs.

The present invention solves the problem and permits back pedal shifting of multiple speed hubs without jerks, wear or damage to the hub. In its broadest aspect the present invention breaks any direct mechanical connection between the back pedal shifting mechanism and the movement of the star shaped shifting member. In the break there is introduced a spring of only very moderate compression, just sufficient to permit the shifting member to move in the high gear shift when it is not opposed by anything solid, such as the end of a pin. Thus when a pin is hit end on by the shifting member the spring compresses very slightly and as the pin slips past it then urges the shifting member further back on the pin so that it is in driving relationship. At the same time the resilient connection between the back pedal shifting and the star shaped member aids in moving it between the projections on the inner surface of the ring gear. These projections did not present as serious a problem because of their shape, but it is significant that the present invention makes this contact also soft and reduces wear. It thus performs two functions, both protecting against the serious problems involved when a pin end is struck and the somewhat less serious problems with the internal projections on the member attached to the ring gear.

In its broader aspects the present invention is not limited to any particular back pedalling mechanism which produces different lateral movements for shifting in sequence from one gear to another. In a more specific aspect, however, it is preferred to use a pair of notched plates with three depths of notches. One of these plates is free to move on the central shaft, and the other has a frictional engagement when back pedalling is used. Neither rotates continuously in forward drive. In other words, they do not carry the driving torque. This mechanism is preferred, and gives an extremely reliable result. As mechanical element the notched plates are not new to mechanics. In fact they have been described in U.S. Patent 2,953,945 for use in a two speed hub. There, however, they perform a different function, namely the transmission of torque, as well as sliding to produce the shift. When the round tooth plates are so used problems of wear arise because of the great forces on the edges of the teeth when the bicycle is being pedalled vigorously. This introduces serious wear problms, and for this reason the design of the above referred to patent has not appeared in commercially available back pedal shifting two speed hubs. In the present case neither plate turns continuously and does not have to transmit torque. The only function is to move the shifting member laterally, a function which requires very little force, orders of magnitude less than transmission of pedalling torque.

The invention will be described in greater detail in conjunction with the drawings in which.

Figure 1:
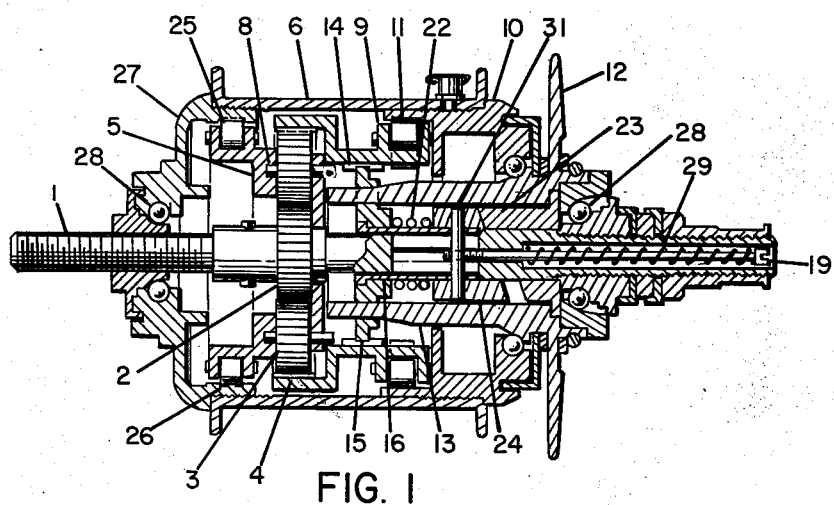
FIG. 1 is a cross-section through a three speed hub.

The basic organization of the gears will first be described. This is not changed by the present invention. A stationary shaft 1 is bolted into the bicycle framework. It carries a sun gear 2 which does not turn. Around this gear are the planets 3 and a ring gear 4. The planets are mounted on pins 8 in a cage 5 which also carries pawls 25 cooperating with ratchets 26 on a framework 27 which is screwed into the hub 6. The conventional ballbearings 28 are provided.

The ring gear has an extended portion 9 and carries pawls 11 cooperating with ratchets on a member 10 and constituting one way engaging means which is also screwed into the hub 6. The member 9 is also provided with internal projections 14 spaced around its inner surface. Drive for the hub is from a sprocket 12 of conventional design which carries a slotted sleeve 13. Through the slots project arms 15 of a shifting member. The arms 15 are provided with a shoulder 18 and a projecting flange 17. The member 15 is free to slide and rotate on a sleeve 16 provided with a shoulder 32 engaging the member 15. The other side of the member 15 engages a spring 22 which is free to rotate or slide on the sleeve 16.

Two slotted plates 23 and 24 are provided. Plate 24 is free to slide on the sleeve 16 and engages the pin 31 at the other end of the sleeve. The spring 22 abuts against the plate 24. Plate 24 and sleeve 16 are prevented from turning by the pin 31 which projects through a hollow portion of the shaft 1 and is engaged by a spring 29 the tension of which is adjusted by the threaded plug 19. The effect of the spring 29 is to urge the plate 24 to the right against the plate 23. The latter is free to turn on the shaft 1, but not to slide. A pawl and ratchet 30 (see FIG. 2), connects plate 23 to the sprocket 12. The ratchet and pawls are so arranged that when the sprocket turns in the forward direction it free wheels over plate 23. Any back pedalling, however, forces the plate 23 to turn backward as shown by the arrows in FIG. 3 and FIG. 4, and this in turn forces the plate 24 to slide to the left.

Figure 2:
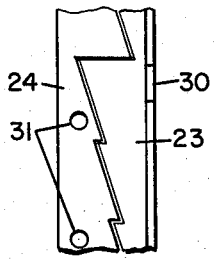
FIGS. 2 to 4 are enlarged details of the shifting plates in three positions.
Figure 3:
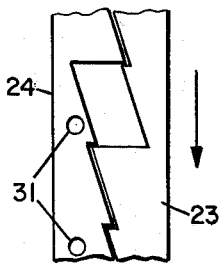
Figure 5:
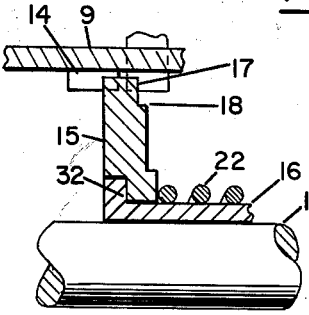
FIG. 5 is a detail on an enlarged scale of the end of one arm of the shifting member and the engaging projections and pawls.

FIG. 2 represents the position of the plates for low gear. In this position the member 15 is in its extreme right hand position as shown in FIG. 5. It still engages the internal projections 14 on the member 9 and it also throws out the pawls 11 so that the member 10 is no longer connected to the member 9, and it, together with the hub 6, may turn in either direction with respect to member 9. Most important, it can turn backward, that is to say counterclockwise looking at FIG. 1 from the right. The drive from the sprocket 12 through the member 15 turns the ring gear 4 through the member 9. This in turn causes the planets 3 to roll around the sun gear 2 and their cage 5 also rotates, but of course at a slower speed than the ring gear 4. The pawls 26 drive the hub 6, and with it the member 10 at this same slower speed. In other words the member 10 will be moving backward in relation to the member 9.

If now there is a short back-pedal the member 23 turns counterclockwise and climbs the slopes on 24. Since it cannot slide on the shaft 1 it forces member 24 to move to the left into the position shown in FIG. 3. In this position the member 15 has been moved sufficiently to the left so that the pawls 11 now connect member 9 to member 10 and it, and with it the hub, are therefore driven at sprocket speed. This is represented also in FIG. 1. The ring gear 4 turns and so do the planets. This means that the planet cage 5 will be turning more slowly than the ring gear 4 and hence also more slowly than the hub 6. However, the pawls and ratchet 26 permit the hub to free wheel and therefore the hub will continue to be driven at sprocket speed. This second gear.

Figure 4:
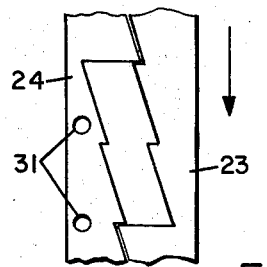

The next back pedal causes further movement of the plates 23 and 24 to the position shown in FIG. 4 in which the member 15 is urged into its extreme left-hand position. If as it moves it does not strike the ends of the pins 8 it now assumes its high gear driving position. If it does strike a pin 8 on the end spring 22 compresses and as described before, prevents damage until the pin and member 15 are moved sufficiently so the latter can slide along the pins into its normal high gear position. In high gear the member 5 and with it the planets 3 are driven at sprocket speed. This causes the ring gear 4 to rotate in the same direction but faster. Since in the extreme left-hand position of member 15 the pawls 11 unlock, member 9 is connected to 10, the latter is forced to rotate at the same speed as the ring gear 4, and with it the hub turns at a speed greater than sprocket speed. This is high gear. The hub 6 will be moving faster than the planet cage 5 but again the pawls 26 permit it to over-run and so normal high gear or overdrive takes place. The next back pedal, of course, restores the plates to the position of FIG. 2 as plate 24 is continuously urged to the right by the spring 29. Movement of the plate 29 to the right moves the sleeve 16 with it.

It will be noted that each back pedalling shift is completely positive; it is not dependent on the adjustment of any cable, lever or spring. The plate 24 is moved into each of its precise positions by the full force of the back pedalling sprocket. As soon as back pedalling ceases and forward pedalling starts there is a very slight friction on the plate 23 due to the fact that free wheeling pawls 30 exert a very slight drag, but a definite one. If the back pedalling stops and the forward pedalling starts at a point intermediate between one of the positions of FIGS. 2, 3 and 4, the slight frictional drag on plate 23 when forward pedalling starts causes it to move a little, its teeth sliding downhill on the slopes of plate 24 until they strike a tooth on plate 24 in one of the three positions shown. The pull on plate 24 by the spring 29 which urges it to the right likewise exerts a component to cause the plate 23 to move clockwise a little down the slope until it strikes the next tooth. In other words, as soon as forward pedalling starts the plates 23 and 24 stop in the exact positions for any particular gear. These positions do not change for the member 24 is pinned to the shaft 1 and so there cannot be a situation where the gear is not exactly in position for a particular gear. This drawback of manual shifting, therefore, does not occur. At the same time since plates 23 and 24 do not have to transmit any driving torque there is no problem with wear on their tooth edges and the shifting mechanism remains automatically in perfect adjustment.

The present invention has been described in conjunction with a back pedal shifted three speed hub. This means that there are three tooth positions. If there is a different number of speeds there has to be a corresponding number of positions.

I claim:

1. In a multiple speed epicyclic gear train which comprises a final driven member, a fixed axle, a sun gear thereon, planet gears rolling therearound, a ring gear, the planets being in a cage provided with driving pins, a driving member having a slotted extension, and a shifting member rotatably mounted on the fixed shaft axle and slidable thereon in the slots of the driving member, said shifting member in one position drivingly engaging the pins of the planet cage and in other positions engaging a member rigidly connected to the ring gear, one way engaging means connected between the ring gear and the final driven member, said engaging means being engaged when said shifting member is in said one position, the planet cage then being drivingly connected to drive final driven member through said one-way engaging means, an overrunning clutch interposed between said cage and said driven member, said clutch overrunning when said shifting member is in said one position, the improvement which comprises, (a) means for shifting the shifting member laterally toward the pins of the planet cage, said means being actuated by a short reverse rotation of the driving member which connects to the shifting means through an overrunning clutch permitting overrunning on forward rotation of said driving member;

(b) said shifting means comprising a member laterally movable by the short reversed rotation, and axially resilient means abutting against the ends of said laterally movable member and the shifting member so that when the shifting member momentarily strikes the end of a driving pin on the planet cage the resilient means are compressed until the shifting member has passed the pin and then urge the shifting member into driving contact with the pins on the planet cage, and (c) a sleeve on the fixed axle having means engaging the shifting member and connected to the shifting means for shifting the shifting member so that movement of the shifting means in one direction causes the shifting member to slide with the sleeve and in the other direction to cause compression of the resilient means and consequent relative sliding movement between said shifting member and said sleeve.

2. A gear train according to claim 1 in which (d) said member rigidly attached to the ring gear being provided with internal projections at points around its inner surface and adapted to contact the shifting member, means to unlatch said one-way engaging means, and (e) the shifting member being provided at the ends of its arms with shoulders, the shoulders being sufficiently deep so that in a second position the shifting member drivingly contacts the sides of the internal projections, thus driving the ring gear, and the shoulder is too low to release said engaging means connecting the ring gear to the final driven member, and the ends of the shifting member arms in a third position simultaneously contact the internal projections and said unlatching means whereby in said second position the driven member is driven at a 1 to 1 ratio, and in said third position the driven member is driven from the planet cage through said overrunning clutch at a lower r.p.m. than the driving member.

3. A gear train according to claim 1 in which the shifting means for shifting the shifting member laterally further comprises a pair of toothed rings having respectively teeth and matching notches sequentially in three different depths, one ring being axially movable with the sleeve but incapable of rotating, the other ring being rotatably mounted on the fixed shaft but incapable of axial movement and being connected to the driving member through a ratchet and pawl connection which forms a second overrunning clutch when the driving member is rotating in forward direction, whereby reverse rotation of the driving member rotates the second ring causing its teeth to move to the next notch of the first ring and thereby produce axial movement of the first ring which is incapable of turning, the first ring being resiliently abutting against the shifting member.

No references cited.

DON A. WAITE, *Primary Examiner.*